S. BELL.
HARVESTER.
No. 10,581. Patented Feb. 28, 1854.
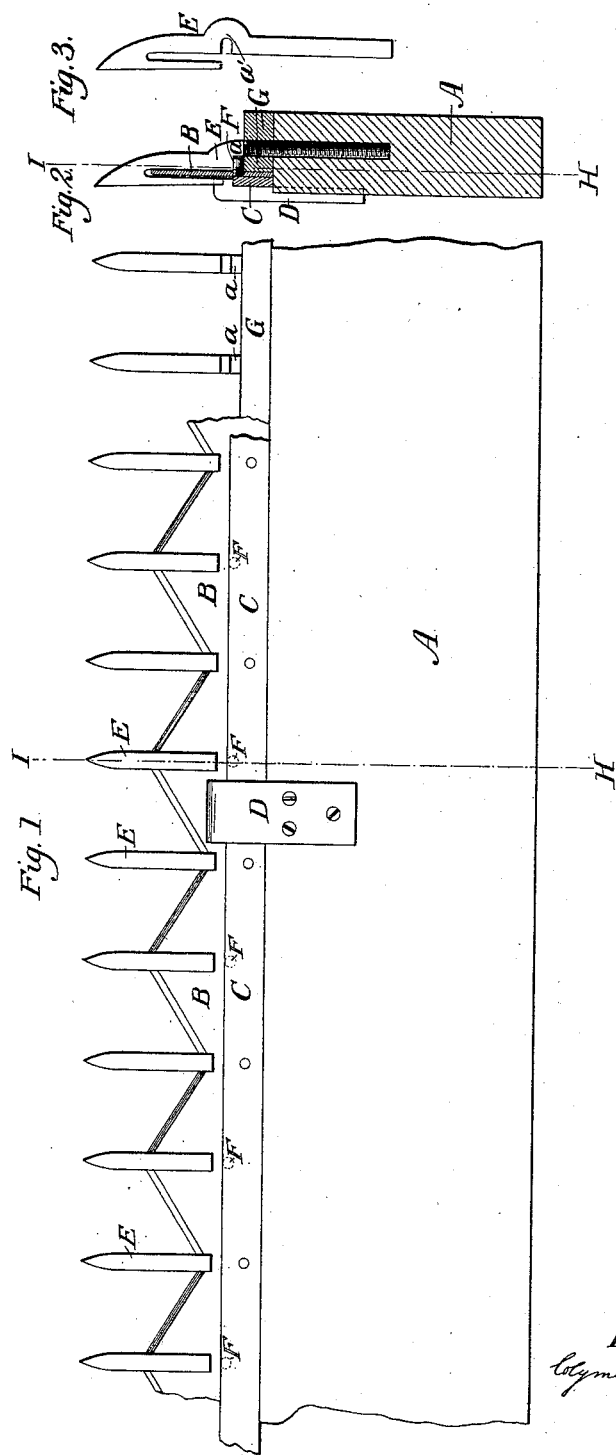
Inventor.
Colyman Bell.

UNITED STATES PATENT OFFICE.

SOLYMAN BELL, OF MARSEILLES, ILLINOIS.

IMPROVEMENT IN HARVESTERS.

Specification forming part of Letters Patent No. 10,581, dated February 28, 1854.

*To all whom it may concern:*

Be it known that I, SOLYMAN BELL, of Marseilles, in the county of La Salle and State of Illinois, have invented a new and useful Improvement in Sickles used in Reapers, Grain-Cutters, Grass-Cutters, &c.; and I do hereby declare that the same is described and represented in the following specification and drawings.

The nature of my invention consists in making a series of pins or studs to project from the under side of the sickle, and in making a score in the guards for said pins to traverse through as the sickle is vibrated, so that any leaves or stalks which are carried across the guards by the teeth of the sickle will be removed by the pins when they are brushed back into the score by the stubble, thereby preventing the leaves and stalks from accumulating on the guard and clogging the sickle, so that it cannot operate freely.

To enable others skilled in the art to make and use my improvements, I will proceed to describe their construction and use, referring to the drawings above mentioned, in which the same letters indicate like parts in each of the figures.

Figure 1 is a plan of a portion of a sickle-stock and sickle. Fig. 2 is a section through the line H T on Fig. 1; and Fig. 3 is one of the guards, made with a square shank to be inserted in the sickle-stock.

In these drawings, A is the sickle-stock. G is a bar of iron placed in front of the sickle-stock, and perforated for the shanks of the guards E E, which are inserted in the bar G and screwed into the stock A, as represented. The guards E E may be made with a screw-shank, as represented in Fig. 2, or with a square shank, like Fig. 3, and the holes in the bar G should be made round or square, to suit the shanks of the guards used. These guards are made with a recess, $a$, Fig. 1, or a score, $a'$, Fig. 3, as may be most desirable. When made as represented in Fig. 2 the bar G forms one side of the score $a$. The sickle is made by riveting the teeth B to the bar C, and is held back against the stock A by the bracket D, fastened to the stock, which allows of its being traversed in the usual manner, so as to cut the crop to be harvested.

I place a series of pins, F, in the under side of the sickle (represented by dotted lines in Fig. 1) in such a position that as the sickle is traversed they will be carried into or through the scores $a$ in the guards E, so as to remove any leaves or stalks which may be carried across the guards by the teeth and brushed back into the scores $a$ by the stubble, and thereby prevent the guards from becoming clogged by an accumulation of grass and stalks upon them, so as to bind the sickle and prevent it from traversing freely.

Some device or contrivance that would remove the leaves and stalks carried across the guards by the sickle-teeth, so as to prevent the sickle from being obstructed by them, was a desideratum long sought for by the makers of harvesting-machines; but no device heretofore made has been so effectual, so cheap, and so permanent and durable as my improvements.

I do not intend to confine myself to the precise position of the pins represented in the sickle, but to put them in such a position as may be desirable.

What I claim as my invention, and desire to secure by Letters Patent, is—

The pins in the sickle, or their equivalents, in combination with the scores in the guards, or their equivalents, so constructed and operated as to remove the leaves and stalks and prevent the guards from becoming clogged, so as to obstruct the motion of the sickle.

SOLYMAN BELL.

Attest:
BARBER BELL,
MIRAN J. LIGHTHART.